US011104377B1

(12) United States Patent
Shibata et al.

(10) Patent No.: US 11,104,377 B1
(45) Date of Patent: Aug. 31, 2021

(54) ELECTRIC POWER STEERING CONTROL DEVICE

(71) Applicant: NSK LTD., Tokyo (JP)

(72) Inventors: Tsutomu Shibata, Tokyo (JP); Takamitsu Koukami, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/274,685

(22) PCT Filed: Jul. 17, 2020

(86) PCT No.: PCT/JP2020/027800

§ 371 (c)(1),
(2) Date: Mar. 9, 2021

(87) PCT Pub. No.: WO2021/010459

PCT Pub. Date: Jan. 21, 2021

(30) Foreign Application Priority Data

Jul. 18, 2019 (JP) ............................ JP2019-132955

(51) Int. Cl.
*B62D 5/04* (2006.01)
*B62D 6/10* (2006.01)

(52) U.S. Cl.
CPC ............. *B62D 5/0463* (2013.01); *B62D 6/10* (2013.01); *B62D 5/0484* (2013.01)

(58) Field of Classification Search
CPC ....... B62D 5/0463; B62D 6/10; B62D 5/0484
See application file for complete search history.

(56) References Cited

U.S. PATENT DOCUMENTS

| | | | | |
|---|---|---|---|---|
| 9,604,666 | B2 * | 3/2017 | Nakayama | B62D 5/0463 |
| 2002/0053481 | A1 | 5/2002 | Itakura et al. | |
| 2006/0021822 | A1 | 2/2006 | Yamamoto | |

(Continued)

FOREIGN PATENT DOCUMENTS

| | | |
|---|---|---|
| JP | 2002-127927 A | 5/2002 |
| JP | 2005-153709 A | 6/2005 |

(Continued)

OTHER PUBLICATIONS

International Search Report for PCT/JP2020/027800 dated Aug. 25, 2020 [PCT/ISA/210].

(Continued)

*Primary Examiner* — Behrang Badii
(74) *Attorney, Agent, or Firm* — Sughrue Mion, PLLC

(57) ABSTRACT

A gain target value is set to a usual value when battery voltage is within a usual range, and to a value below the usual value when the battery voltage is outside the usual range. When the battery voltage is recovered from outside the usual range to the usual range, it is determined whether or not a ratio obtained by dividing a time-integrated value of a gain in a period from when the battery voltage goes outside the usual range to when being recovered to the usual range by a time-integrated value of the gain when the gain in the period is the usual value is larger than a prescribed threshold. When determined to be larger than the prescribed threshold, the gain is set to immediately increase up to the gain target value, otherwise the gain is set to gradually increase up thereto.

5 Claims, 14 Drawing Sheets

(56) References Cited

U.S. PATENT DOCUMENTS

2008/0067960 A1* 3/2008 Maeda .................. B62D 5/046
318/400.02
2010/0289460 A1* 11/2010 Otake ...................... H02P 9/04
322/19
2016/0272237 A1* 9/2016 Kawamura ............. B62D 5/04

FOREIGN PATENT DOCUMENTS

JP 2008-307968 A 12/2008
JP 4581535 B2 11/2010

OTHER PUBLICATIONS

Written Opinion for PCT/JP2020/027800 dated Aug. 25, 2020 [PCT/ISA/237].

* cited by examiner

FIG. 11A
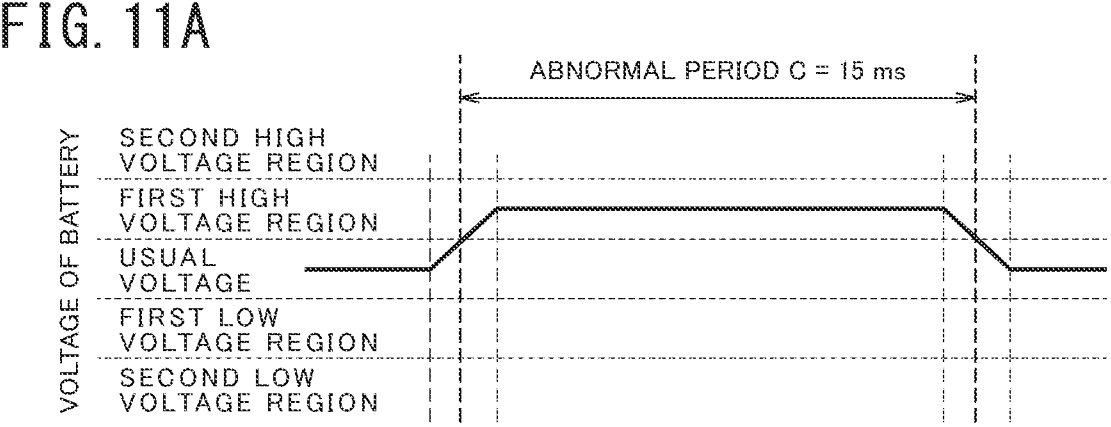
FIG. 11B
GAIN TARGET VALUE G*
1.0
SET VALUE
0
FIG. 11C
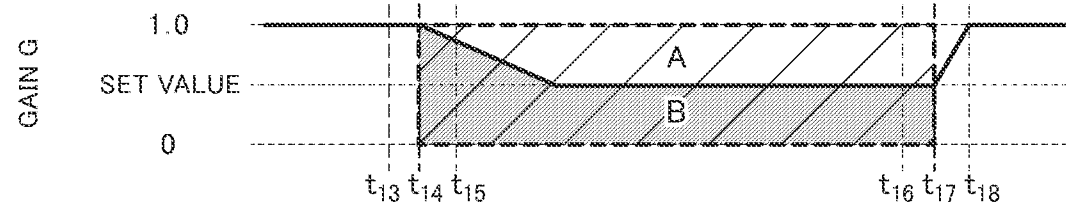

FIG. 12A
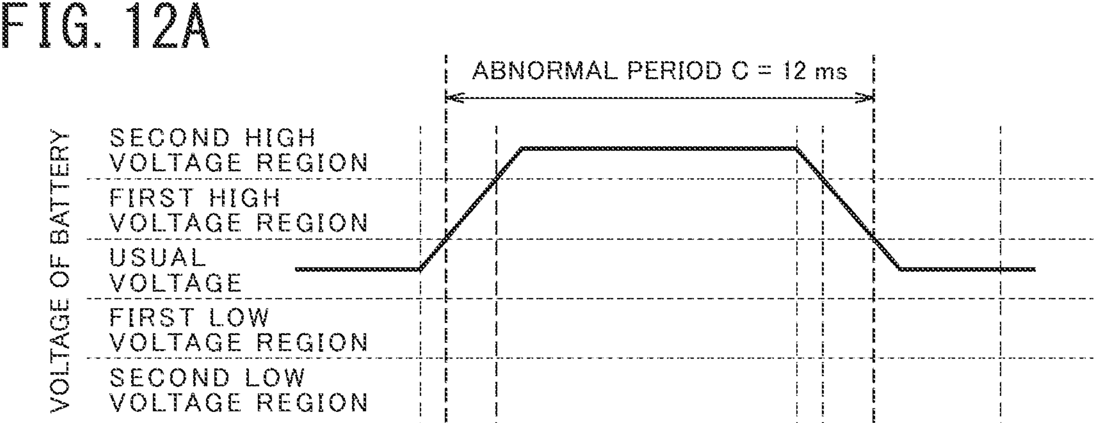
FIG. 12B
GAIN TARGET VALUE G*
1.0
SET VALUE
0
FIG. 12C
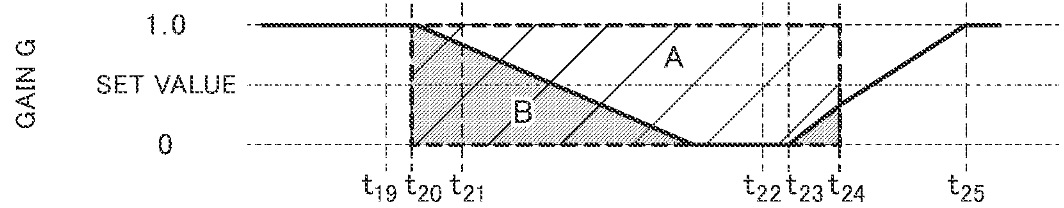

MCU
22
29
CONTROL UNIT
27
CURRENT COMMAND VALUE CALCULATION UNIT
28
CURRENT COMMAND VALUE CORRECTION UNIT
37
THREE-PHASE CONVERSION UNIT
23
PWM DRIVE UNIT
G
30
INITIALIZATION UNIT
31
VOLTAGE ACQUISITION UNIT
32
TARGET VALUE SETTING UNIT
33
GAIN SETTING UNIT
35
RECOVERY RATE SETTING UNIT
36
RECOVERY RATE CORRECTION UNIT
34
STEERING ANGULAR VELOCITY CALCULATION UNIT
dδ/dt
T
V
δ

ELECTRIC POWER STEERING CONTROL DEVICE

CROSS REFERENCE TO RELATED APPLICATIONS

This application is a National Stage of International Application No. PCT/JP2020/027800 filed Jul. 17, 2020, claiming priority based on Japanese Patent Application No. 2019-132955 filed Jul. 18, 2019.

TECHNICAL FIELD

The present invention relates to an Electric power steering control device.

BACKGROUND ART

Conventionally, electric power steering control devices (for example, see PTL 1) have been proposed to reduce an assist force when an electrical abnormality is detected in hardware, such as a motor or a torque sensor. In the electric power steering control device described in PTL 1, assist force is immediately increased if abnormality duration is less than a prescribed time when there is no electrical abnormality detection after detecting an electrical abnormality. This prevents giving a steering feeling that the steering wheel suddenly feels heavy. Additionally, if the abnormality duration is equal to or more than the prescribed time, the assist force is gradually increased, which prevents giving the steering feeling that the steering wheel suddenly becomes light.

CITATION LIST

Patent Literature

PTL 1: JP Pat. No. 4581535

SUMMARY OF INVENTION

Technical Problem

However, such an electric power steering control device requires further improvement in steering feeling.

The present invention has focused on the problem as above, and it is an object of the present invention to provide an electric power steering control device capable of improving steering feeling.

Solution to Problem

To achieve the above object, according to an aspect of the present invention, there is provided an electric power steering control device including: (a) a motor configured to receive electrical power from a battery and output an assist force for assisting steering with a steering wheel; (b) a battery voltage sensor configured to detect a voltage of the battery; (c) a target value setting unit configured to set a gain target value, which is a target value of a gain used to control the assist force output by the motor, on a basis of the voltage detected by the battery voltage sensor; (d) a gain setting unit configured to set the gain on a basis of the gain target value set by the target value setting unit; (e) a torque sensor configured to detect a steering torque applied by the steering wheel; and (f) a control unit configured to control the assist force output by the motor on a basis of the gain set by the gain setting unit and the steering torque detected by the torque sensor, (g) wherein the target value setting unit sets the gain target value to a predetermined usual value when the voltage detected by the battery voltage sensor is within a predetermined range of usual voltage, and sets the gain target value to a value below the usual value when the voltage is outside the range of the usual voltage; and (h) wherein when the voltage detected by the battery voltage sensor is recovered from outside the range of the usual voltage to within the range of the usual voltage, the gain setting unit determines whether or not a ratio obtained by dividing a time-integrated value of the gain in a period from when the voltage goes outside the range of the usual voltage to when the voltage is recovered to within the range of the usual voltage by a time-integrated value of the gain when the gain in the period is the usual value is larger than a predetermined prescribed threshold, the gain setting unit setting the gain to immediately increase up to the gain target value when the ratio is determined to be larger than the prescribed threshold, and setting the gain to gradually increase up to the gain target value when the ratio is determined to be equal to or less than the prescribed threshold.

Advantageous Effects of Invention

According to the one aspect of the present invention, for example, when the time-integrated value of the gain from when the voltage of the battery goes outside the range of the usual voltage to when the voltage thereof is recovered to within the range of the usual voltage is large, the gain is immediately increased up to the gain target value, which can thus reduce the time during which the steering wheel feels heavy.

Additionally, when the time-integrated value of the gain is small, the gain is gradually increased up to the gain target value, which can thus prevent the steering wheel from becoming light suddenly. Accordingly, there can be provided an electric power steering control device capable of improving steering feeling.

BRIEF DESCRIPTION OF DRAWINGS

FIGS. 7A and 7B are diagrams illustrating how the voltage of a battery fluctuates, in which FIG. 7A is a diagram illustrating the operating state of a starter motor, and FIG. 7B is a diagram illustrating the fluctuating state of the voltage of the battery;

FIGS. 8A to 8C are diagrams illustrating operation of the electric power steering control device, in which FIG. 8A is a diagram illustrating the voltage of the battery, FIG. 8B is a diagram illustrating gain target value, and FIG. 8C is a diagram illustrating gain;

FIGS. 9A to 9C are diagrams illustrating operation of the electric power steering control device, in which FIG. 9A is a diagram illustrating the voltage of the battery, FIG. 9B is a diagram illustrating gain target value, and FIG. 9C is a diagram illustrating gain;

FIGS. 10A to 10C are diagrams illustrating operation of the electric power steering control device, in which FIG. 10A is a diagram illustrating the voltage of the battery, FIG. 10B is a diagram illustrating gain target value, and FIG. 10C is a diagram illustrating gain;

FIGS. 11A to 11C are diagrams illustrating operation of the electric power steering control device, in which FIG. 11A is a diagram illustrating the voltage of the battery, FIG. 11B is a diagram illustrating gain target value, and FIG. 11C is a diagram illustrating gain;

FIGS. 12A to 12C are diagrams illustrating operation of the electric power steering control device, in which FIG. 12A is a diagram illustrating the voltage of the battery, FIG. 12B is a diagram illustrating gain target value, and FIG. 12C is a diagram illustrating gain;

DESCRIPTION OF EMBODIMENTS

Figures 7A, 7B:
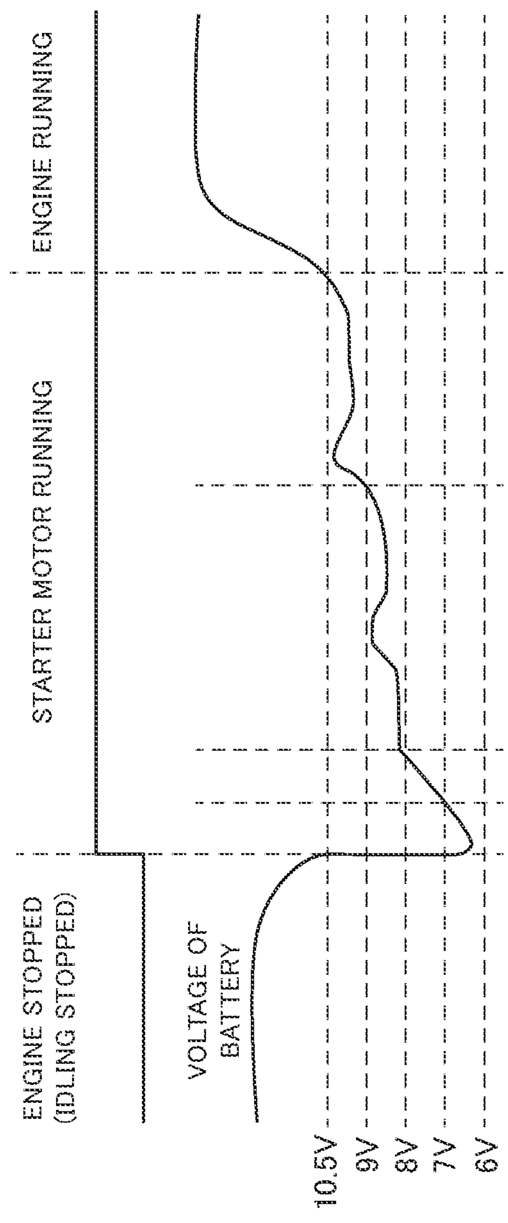

The present inventors have found the following problems in conventional electric power steering control devices. In the convention electric power steering devices, when a starter motor connected to engine is started up, a large current momentarily flows through the starter motor, and battery voltage drops, as illustrated in FIGS. 7A and 7B. Then, the battery voltage drop reduces assist force, which can give a steering feeling that the steering wheel suddenly feels heavy.

In addition, when a tire rides up on a curb and receives a steering reaction force, a motor regenerative current is generated, which may momentarily increase battery current. Even in this case, assist force is reduced for circuit protection, whereby the steering wheel suddenly feels heavy, and when the state continues for a certain period of time, there may be given a discomfort in operational feeling.

Hereinafter, an example of an electric power steering control device according to an embodiment of the present invention will be described with reference to FIGS. 1 to 15. It should be noted that the present invention is not limited to the following example. Additionally, effects described in the present specification are merely examples and not intended to be limiting, and there may be other effects than those.

(Entire Structure of Electric Power Steering Control Device)

Figure 1:
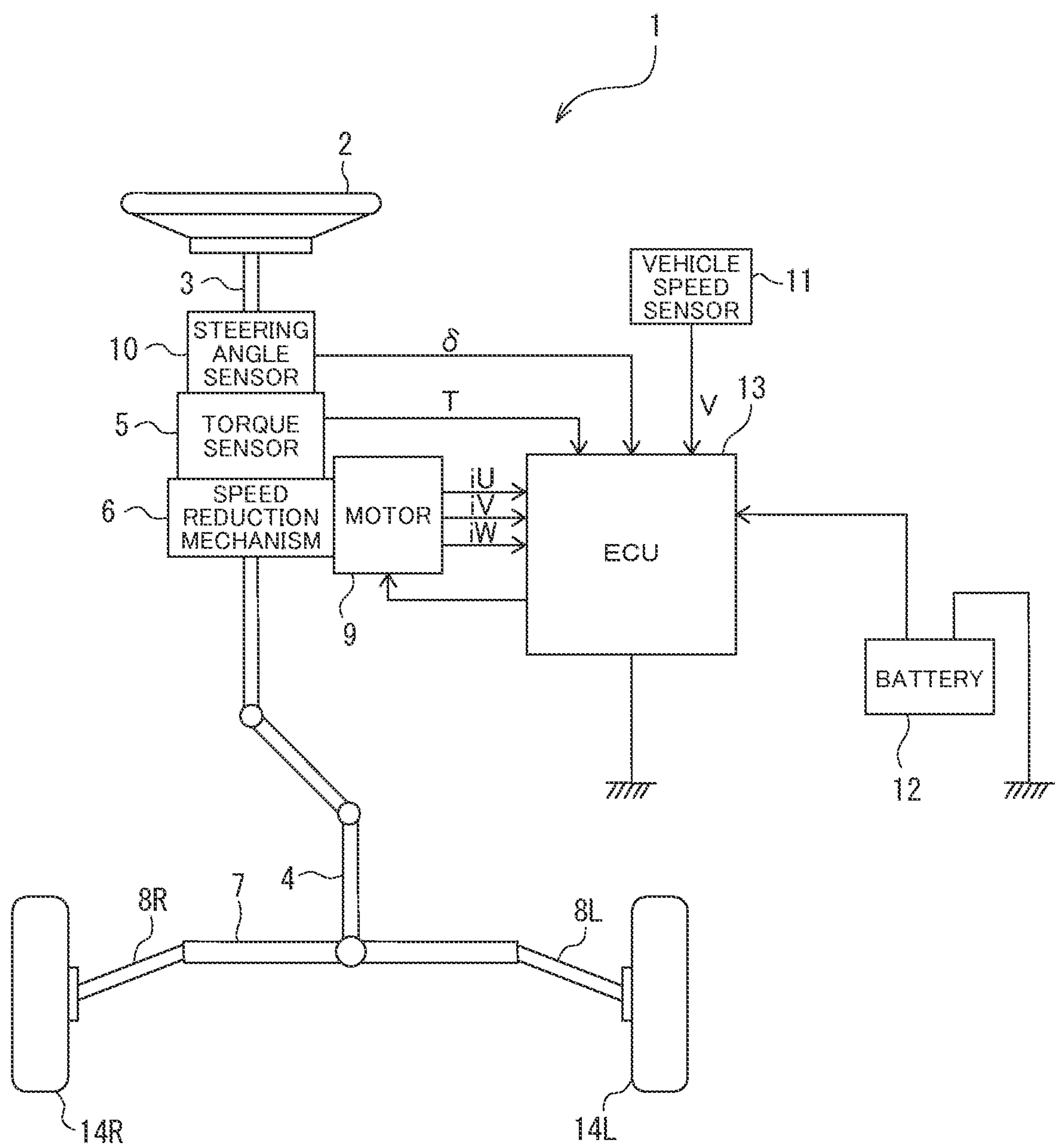
FIG. 1 is a diagram illustrating the structure of an electric power steering control device according to a present embodiment.

FIG. 1 is a diagram illustrating the entire structure of the electric power steering control device according to the embodiment of the present invention. An electric power steering control device 1 of FIG. 1 is applied to a column type electric power steering (EPS) that provides an assist force on a steering shaft 3 side.

As illustrated in FIG. 1, the electric power steering control device 1 of the present embodiment includes a steering wheel 2, a steering shaft 3, a pinion input shaft 4, a torque sensor 5, a speed reduction mechanism 6, a rack and pinion 7, rods 8L and 8R, a motor 9, a steering angle sensor 10, a vehicle speed sensor 11, a battery 12, and an electric control unit (ECU) 13.

One end side of the steering shaft 3 is connected to the steering wheel 2. An other end side of the steering shaft 3 is connected to an input side of the torque sensor 5. An output side of the torque sensor 5 is connected to one end side of the pinion input shaft 4. The torque sensor 5 is composed of one torsion bar and two resolvers each attached to each end of the torsion bar to sandwich the torsion bar, in which one end side of the torsion bar is an input end and an other end side thereof is an output end. The two resolvers detect an amount of distortion or the like of the torsion bar that occurs between the input and output ends, whereby a steering torque T applied by the steering wheel 2 is detected. The detected steering torque T is output to the ECU 13.

The speed reduction mechanism 6 is connected on the way of the pinion input shaft 4. The speed reduction mechanism 6 transmits an assist force output from the motor 9 to another end side of the pinion input shaft 4. Additionally, on the other end side of the pinion input shaft 4 is formed a pinion gear that can engage in a rack groove of a rack shaft forming the rack and pinion 7. The rack and pinion 7 converts rotational motion of the pinion input shaft 4 to linear motion of the rack shaft. In addition, the rods 8L and 8R are connected to both ends of the rack shaft. End portions of the rods 8L and 8R are connected to steered wheels 14L and 14R via a knuckle or the like. As a result, when the pinion input shaft 4 rotates, actual steering angles of the steered wheels 14L and 14R change via the rack and pinion 7, the rods 8L and 8R, and the like. In other words, it is possible to steer the steered wheels 14L and 14R according to rotation of the pinion input shaft 4.

The steering angle sensor 10 detects a steering angle δ of the steering wheel 2. The vehicle speed sensor 11 detects a vehicle speed V. The detected steering angle δ and vehicle speed V are output to the ECU 13.

The battery 12 supplies electrical power to various electrical components of a vehicle mounted with the electric power steering control device 1, such as the motor 9, the ECU 13, a starter motor, a car air conditioner, a car navigation, and an audio system. Additionally, the battery 12 is charged with electrical power generated by an alternator.

Figure 2:
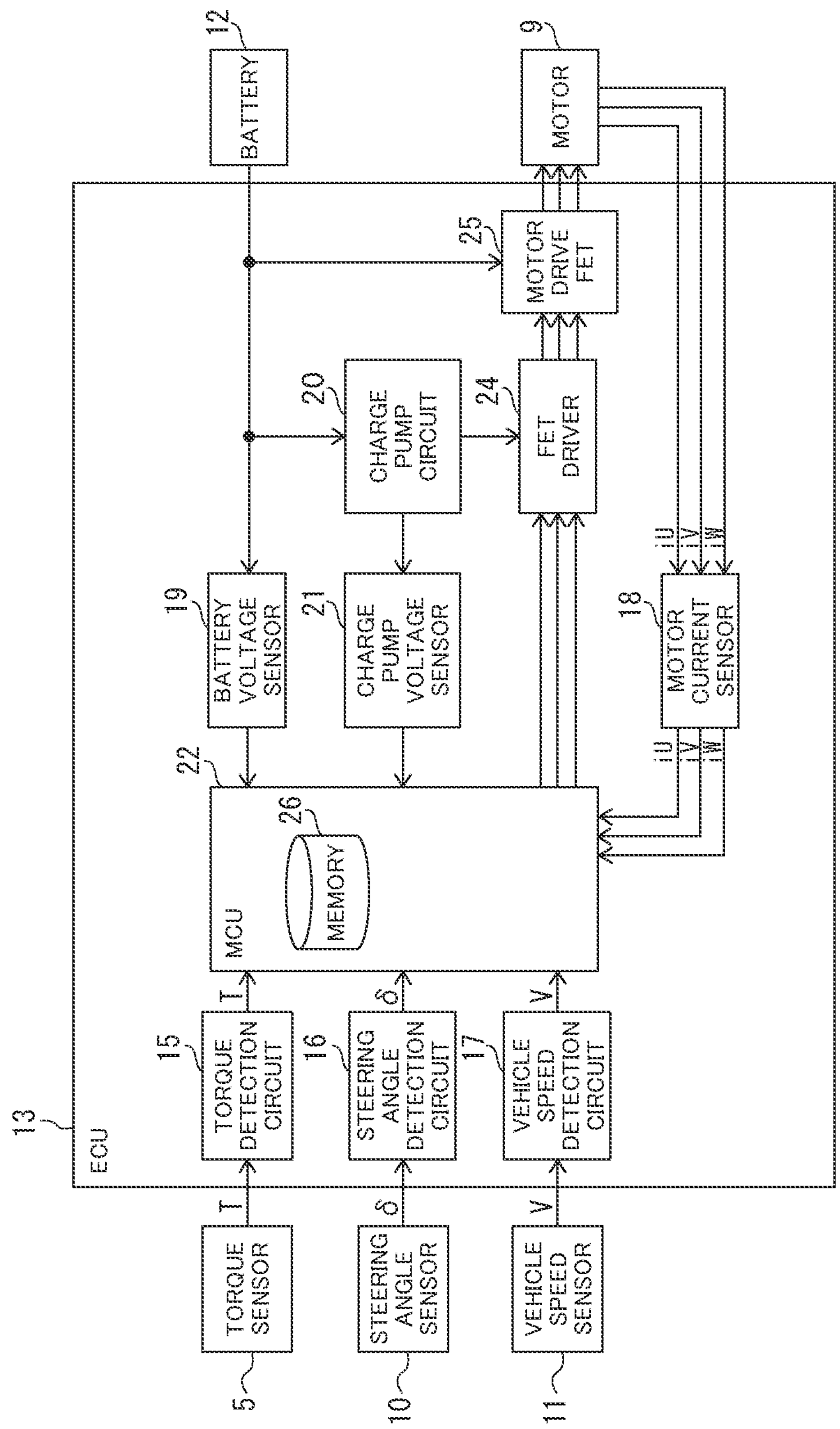
FIG. 2 is a diagram illustrating the inner structure of an ECU.

As illustrated in FIG. 2, the ECU 13 includes a torque detection circuit 15, a steering angle detection circuit 16, a vehicle speed detection circuit 17, a motor current sensor 18, a battery voltage sensor 19, a charge pump circuit 20, a charge pump voltage sensor 21, a micro control unit (MCU) 22, a field effect transistor (FET) driver 24, and a motor drive FET 25.

The steering torque T is input to the torque detection circuit 15 from the torque sensor 5. Additionally, the steering angle δ is input to the steering angle detection circuit 16 from the steering angle sensor 10. The vehicle speed V is input to the vehicle speed detection circuit 17 from the vehicle speed sensor 11. Each of the input steering torque T, steering angle δ, and vehicle speed V is output to the MCU 22. In addition, the motor current sensor 18 detects current values iU, iV, and iW of a current flowing through the motor 9. FIG. 2 illustrates an example using a three-phase motor including a U-phase coil, a V-phase coil, and a W-phase coil as the motor 9. The current value iU is a current flowing through the U-phase coil, the current value iV is the current value of a current flowing through the V-phase coil, and the current value iW is the current value of a current flowing through the W-phase coil. The detected current values iU, iV, and iW of the motor 9 are output to the MCU 22. Furthermore, the battery voltage sensor 19 detects a voltage of the battery 12. The detected voltage of the battery 12 is output to the MCU 22.

The charge pump circuit 20 boosts the voltage of the battery 12. The boosted voltage is applied to the FET driver 24. The charge pump voltage sensor 21 detects the voltage boosted by the charge pump circuit 20. The detected voltage is output to the MCU 22.

The MCU 22 includes a memory 26. The memory 26 stores various kinds of programs executable by the MCU 22. In addition, the memory 26 sequentially stores various kinds of data when the various kinds of programs are executed. Examples of the data sequentially stored at the execution of the programs include a gain G, a gain target value G*, a time-integrated value A, a time-integrated value B, a ratio R, and the like, which will be described later.

For example, a random access memory (RAM) can be used as the memory 26.

Figure 3:
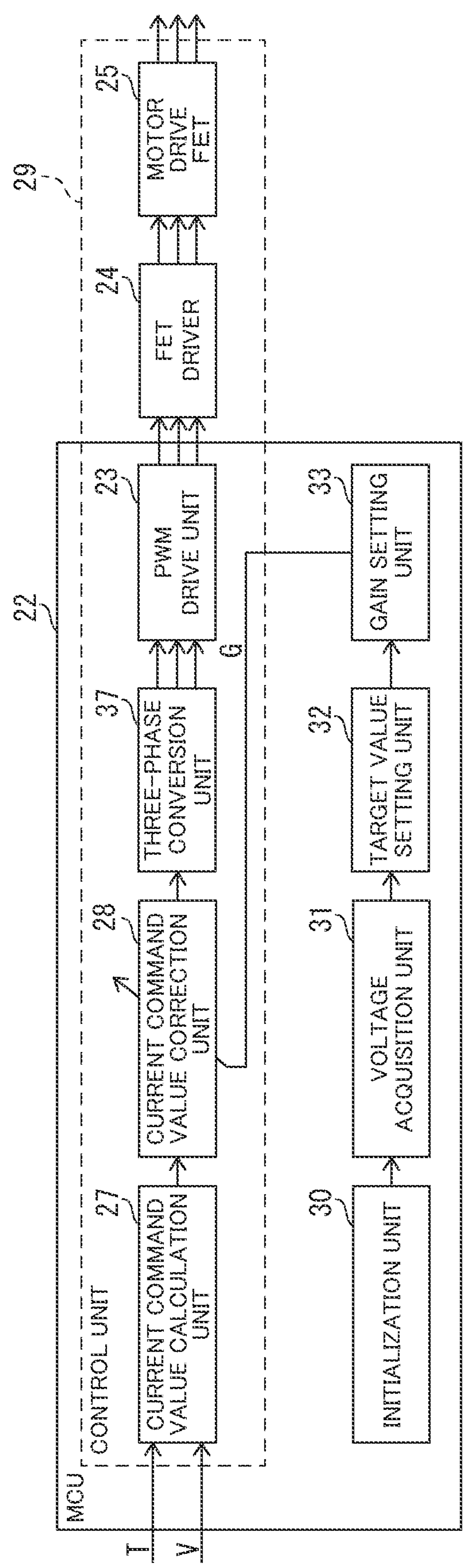
FIG. 3 is a diagram illustrating the inner structure of an MCU.

In addition, when an ignition key is switched from an OFF-state to an ON-state, the MCU 22 reads an assist force control program from the various kinds of programs stored in the memory 26, and executes the program. Then, through the assist force control program, a current command value calculation unit 27, a current command value correction unit 28, a three-phase conversion unit 37, and a pulse width modulation (PWM) drive unit 23 are realized by software, as illustrated in FIG. 3.

The current command value calculation unit 27 calculates a current command value for controlling the assist force output by the motor 9 using an assist map on the basis of the steering torque T output from the torque detection circuit 15 and the vehicle speed V output from the vehicle speed detection circuit 17. The assist map to be used is, for example, a map for outputting a current command value according to the input steering torque T and vehicle speed V when they are input. The calculated current command value is output to the current command value correction unit 28.

The current command value correction unit 28 multiplies the current command value output from the current command value calculation unit 27 by the gain G set by the gain setting unit 33 that will be described later to obtain a corrected current command value. The gain G is set to a numerical value below "1.0" when the voltage of the battery 12 is outside a predetermined range of usual voltage, and when the voltage of the battery 12 goes from outside the range of the usual voltage to within the range thereof, the gain G is continuously changed from the numerical value below "1.0" to "1.0", and then maintained at "1.0". An example of the usual voltage that can be employed is a normal voltage of the battery 12 at which the motor 9 can appropriately output an assist force. Thus, when the voltage of the battery 12 is a normal voltage at which the motor 9 can appropriately output an assist force, the gain G is maintained at "1.0", and the current command value output from the current command value calculation unit 27 becomes a corrected current command value as it is. On the other hand, when the voltage of the battery 12 is an abnormal voltage at which the motor 9 cannot appropriately output an assist force, the current command value output from the current command value calculation unit 27 is reduced and becomes a corrected current command value. The calculated corrected current command value is output to the three-phase conversion unit 37.

The three-phase conversion unit 37 converts the corrected current command value output from the current command value correction unit 28 to a current command value of the U-phase coil of the motor 9, a current command value of the V-phase coil thereof, and a current command value of the W-phase coil thereof. Each of the converted current command values is output to the PWM drive unit 23.

The PWM drive unit 23 calculates PWM signals for allowing the motor 9 to output an assist force according to magnitudes of the converted current command values on the basis of the converted current command values output from the three-phase conversion unit 37. In other words, as the converted current command values are larger, the PWM drive unit 23 calculates PWM signals for allowing the motor 9 to output a larger assist force. As a method for calculating PWM signals, for example, there can be employed a method in which a PI control value is calculated on the basis of differences (iU*−iU), (iV*−iV), and (iW*−iW) between the converted current command values iU*, iV*, and iW* and the current values iU, iV, and iW of the motor 9 detected by the motor current sensor 18, and PWM calculation is performed on the basis of the calculated PI control value to calculate a PWM signal corresponding to the U-phase coil of the motor 9, a PWM signal corresponding to the V-phase coil thereof, and a PWM signal corresponding to the W-phase coil thereof. The calculated PWM signals are output to the FET driver 24.

The FET driver 24 uses electrical power from voltage applied by the charge pump circuit 20 to drive the motor drive FET 25 according to the PWM signals output by the PWM drive unit 23.

The motor drive FET 25, when driven by the FET driver 24, uses electrical power supplied from the battery 12 to supply drive current to the motor 9. The current command value calculation unit 27, the current command value correction unit 28, the three-phase conversion unit 37, the PWM drive unit 23, the FET driver 24, and the motor drive FET 25 are included in a control unit 29 configured to control an assist force output by the motor 9 on the basis of the gain G output from the gain setting unit 33 and the steering torque T output from the torque detection circuit 15.

In the electric power steering control device 1 structured as above, the torque sensor 5 detects the steering torque T applied by the steering wheel 2. Then, the MCU 22 of the ECU 13 calculates a current command value according to the steering torque T and the like, furthermore, the PWM drive unit 23 outputs PWM signals on the basis of the current command value, and the FET driver 24 drives the motor drive FET 25 on the basis of the PWM signals. As a result, in the electric power steering control device 1, the motor drive FET 25 supplies drive current to the motor 9, whereby the motor 9 generates an assist force, which can assist the driver in steering with the steering wheel 2.

Additionally, the MCU 22 reads a gain setting program, simultaneously with the assist force control program, from the memory 26, and executes the programs. Then, an initialization unit 30, a voltage acquisition unit 31, a target value setting unit 32, and a gain setting unit 33 are realized by the gain setting program. The initialization unit 30, the voltage acquisition unit 31, the target value setting unit 32, and the gain setting unit 33 execute gain setting processing.

(Gain Setting Processing)

Next, a description will be given of the gain setting processing executed by the initialization unit 30, the voltage acquisition unit 31, the target value setting unit 32, and the gain setting unit 33.

Figure 4:
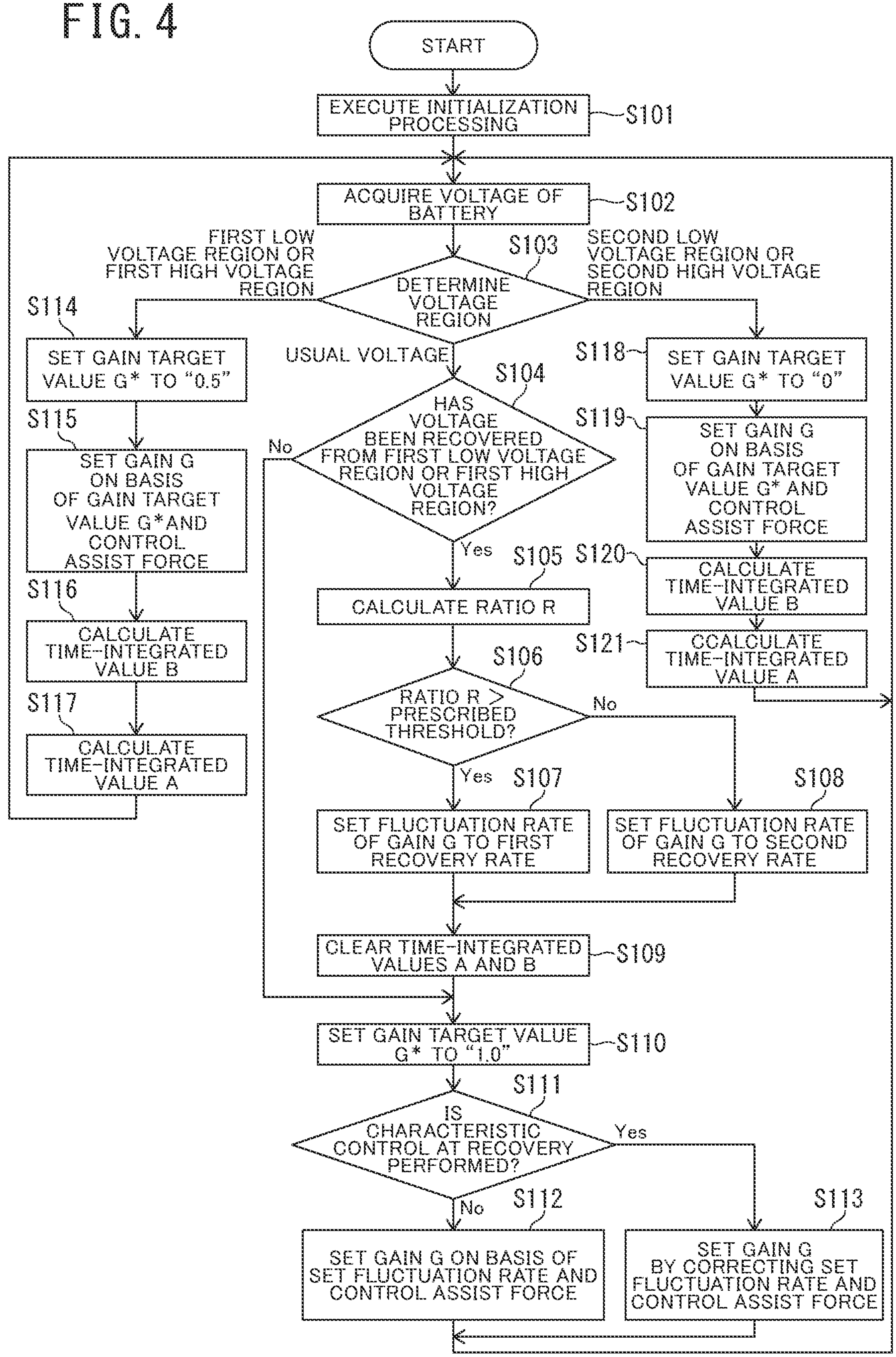
FIG. 4 is a flowchart illustrating gain setting processing.

As illustrated in FIG. 4, first, at step S101, the initialization unit 30 executes initialization processing. Specifically, the initialization unit 30 performs processing for setting a prescribed initial value in a prescribed region of the memory 26. As a result, each of the gain G and the gain target value G* stored in the prescribed region of the memory 26 is set to "1.0". Additionally, each of the time-integrated values A and B is set to "0".

Next, proceeding to step S102, the voltage acquisition unit 31 acquires the voltage of the battery 12 output from the battery voltage sensor 19. The voltage of the battery 12 is acquired every few hundred μs to few ms. Note that, for example, singular voltage data or a moving average value or the like based on plural (three or more) voltage data may be used as the voltage of the battery 12.

Next, proceeding to step S103, the target value setting unit 32 determines within which of the usual voltage, a first low voltage region, a second low voltage region, a first high voltage region, and a second high voltage region the voltage of the battery 12 acquired at step S102 lies. Additionally, a magnitude relationship between the respective regions is as follows: second high voltage region>first high voltage region>usual voltage>first low voltage region>second low voltage region. Then, when the target value setting unit 32 determines that the voltage of the battery 12 is within the range of the usual voltage, processing proceeds to step S104. On the other hand, when the voltage of the battery 12 is determined to be within the first low voltage region or the first high voltage region, processing proceeds to step S114. Furthermore, on the other hand, when the voltage of the battery 12 is determined to be within the second low voltage region or the second high voltage region, processing proceeds to step S118.

At step S104, the gain setting unit 33 determines whether or not the voltage of the battery 12 acquired at step S102 has been recovered from outside the range of the usual voltage to within the range thereof. As a method for determining whether or not there has been the recovery, for example, there can be used a method in which when the voltage of the battery 12 has been determined to be within the first low voltage region or the first high voltage region at step S103 executed at previous cycle of the immediately preceding step S103, the voltage of the battery 12 acquired at step S102 is determined to have been recovered from outside the range of the usual voltage to within the range thereof. Then, when the gain setting unit 33 determines that the voltage of the battery 12 has been recovered (Yes), processing proceeds to step S105. On the other hand, when the voltage thereof is determined not to have been recovered (No), processing proceeds to step S110.

At step S105, the time-integrated value B stored in the prescribed region of the memory 26 is divided by the time-integrated value A to calculate the ratio R.

At step S106, the gain setting unit 33 determines whether or not the ratio R obtained at step S105 is larger than a predetermined prescribed threshold Rth (for example, "0.5"). Then, when the ratio R is determined to be larger than the prescribed threshold Rth of "0.5" (Yes), processing proceeds to step S107. On the other hand, when the ratio R is equal to or less than the prescribed threshold Rth of "0.5" (No), processing proceeds to step S108.

At step S107, the gain setting unit 33 sets a fluctuation rate dG/dt to be used at step S112 or S113 to a relatively fast first recovery rate $dG_1/dt$, and then, processing proceeds to step S109.

At step S108, the gain setting unit 33 sets the fluctuation rate dG/dt to be used at step S112 or S113 to a relatively slow second recovery rate $dG_2/dt$, and then, processing proceeds to step S109. The second recovery rate $dG_2/dt$ used is a rate slower than the first recovery rate $dG_1/dt$.

At step S109, the gain setting unit 33 clears each of the time-integrated values A and B stored in the prescribed region of the memory 26 and sets them to "0".

Next, proceeding to step S110, the target value setting unit 32 sets the gain target value G* to a predetermined usual value (for example, "1.0"). Note that the usual value to be used can be any numerical value that is larger than the prescribed threshold Rth of "0.5", and a numerical value other than "1.0" may be used.

Next, proceeding to step S111, the gain setting unit 33 determines whether or not to perform characteristic control at recovery to set the first recovery rate $dG_1/dt$ or the second recovery rate $dG_2/dt$ in consideration of at least any of the steering torque T, the steering angle δ, the steering angular velocity dδ/dt, the vehicle speed V, and the like. Then, when the characteristic control at recovery is determined not to be performed (No), processing proceeds to step S112. On the other hand, when the characteristic control at recovery is determined to be performed (Yes), processing proceeds to step S113.

At step S112, the gain setting unit 33 sets the gain G on the basis of the fluctuation rate dG/dt set at the step S107 or S108 and the gain target value G* of "1.0" set at step S110. Specifically, the gain setting unit 33 adds a multiplication result obtained by multiplying the fluctuation rate dG/dt set at the step S107 or S108 by an update time $t_o$ to the gain G stored in the memory 26 so that the gain G approaches the gain target value G* of "1.0", and overwrites the gain G stored in the memory 26 with a result of the addition. The update time $t_o$ used is an elapsed time between a previous overwrite of the gain G stored in the memory 26 and the present time.

In addition, simultaneously, the control unit 29 controls the assist force output by the motor 9 on the basis of the gain G stored in the memory 26 and the steering torque T output from the torque sensor 5. Specifically, the current command value correction unit 28 multiplies the gain G stored in the memory 26 by a current command value calculated by the current command value calculation unit 27 to obtain a corrected current command value.

Then, the three-phase conversion unit 37 converts the corrected current command value to current command values of the U-phase coil, V-phase coil, and W-phase coil of the motor 9. Next, the PWM drive unit 23 outputs PWM signals of the U-phase coil, V-phase coil, and W-phase coil of the motor 9 on the basis of the converted current command values. The FET driver 24 drives the motor drive FET 25 according to the output PWM signals, and the motor drive FET 25 supplies drive current to the motor 9. Then, returning to step S102, changes of steps S102→S103→S104→S110→S111→S112 are repeated to repeat the setting of the gain G and the supply of the drive current to the motor 9, whereby the gain G is immediately or gradually increased up to the gain target value G*, as a result of which the assist force output by the motor 9 is immediately or gradually increased.

Figure 5:
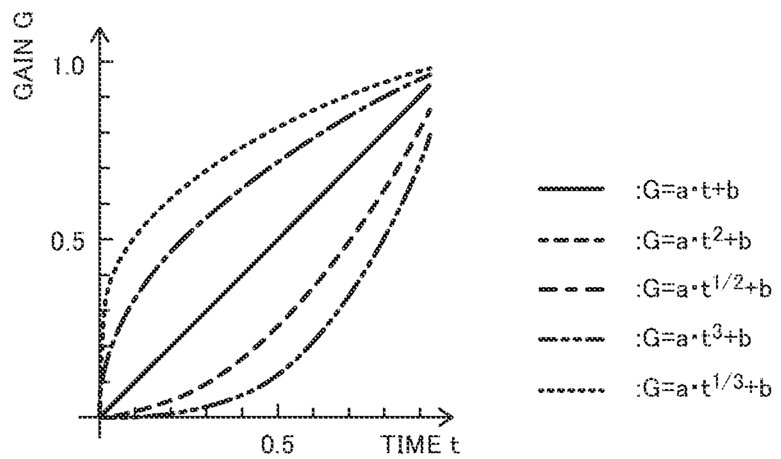
FIG. 5 is a diagram illustrating the state of gain recovery.
Figure 6:
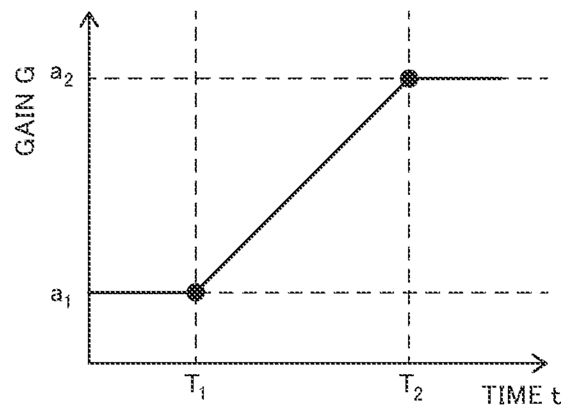
FIG. 6 is a diagram illustrating the state of gain recovery.

On the other hand, at step S113, the gain setting unit 33 sets the gain G on the basis of the fluctuation rate dG/dt set at step S107 or S108 and the gain target value G* of "1.0" set at step S110. Specifically, as illustrated in FIGS. 5 and 6, an adding rate $dG_a/dt$ such that the gain G increases in a first order straight line $G=a\cdot t+b$ is calculated. Here, a and b are fixed values. In FIG. 6, $T_1$ represents a time when recovery of the gain G has started (when the voltage has returned to within the range of the usual voltage), 12 represents a time when the recovery thereof is complete, $a_1$ represents the gain G at the time when the recovery thereof has started, and $a_2$ represents the gain G (=1.0) at the time when the recovery thereof is complete. When these are applied to the above equation: $G=a\cdot t+b$, the results are as follows: $a=(a_2-a_1)/(T_2-T_1)$ and $b=a_1$.

Then, the gain setting unit 33 adds a multiplication result obtained by multiplying an addition value of the calculated adding rate $dG_a/dt$ and the fluctuation rate dG/dt set at step S107 or S108 by the update time $t_o$ to the gain G stored in the memory 26 so that the gain G approaches the gain target value G* of "1.0", and overwrites the gain G stored in the memory 26 with a result of the addition.

Note that while the above description has described an example using the adding rate $dG_a/dt$ that linearly increases the gain G, other structures may be employed. For example, first, it is determined whether or not at least any of the steering torque T, the steering angle δ, the steering angular velocity dδ/dt, and the vehicle speed V is larger than a prescribed threshold. For example, it is determined whether any one or more of four conditions: (1) an absolute value of the steering torque T is larger than a first threshold; (2) an absolute value of the steering angle δ is larger than a second threshold; (3) an absolute value of the steering angular velocity dδ/dt is larger than a third threshold; and (4) the vehicle speed V is larger than a fourth threshold are satisfied. When determined to be satisfied, at least any of the steering torque T, the steering angle δ, the steering angular velocity dδ/dt, and the vehicle speed V is determined to be larger than the prescribed threshold. Then, when determined to be larger than the prescribed threshold, there may be used the adding rate $dG_a/dt$ that increases the gain Gin a slow curve that is a downwardly convex quadratic curve $G=a\cdot t^2+b$.

On the other hand, when it is determined to be smaller than the prescribed threshold, there may be used the adding rate $dG_a/dt$ that increases the gain G in an early rising curve that is an upwardly convex curve $G=a\cdot t^{1/2}+b$. Note that "2" included in the functions of "$t^2$" and "$t^{1/2}$" in the above quadratic curves may be regarded as a variable, and higher order functions, such as "$t^3$" and "$t^{1/3}$" illustrated in FIG. 5, may be used.

In addition, simultaneously, the control unit 29 controls the assist force output by the motor 9 on the basis of the gain G stored in the memory 26 and the steering torque T output from the torque sensor 5. Specifically, the current command value correction unit 28 multiplies the gain G stored in the memory 26 by a current command value calculated by the current command value calculation unit 27 to obtain a corrected current command value.

Then, the three-phase conversion unit 37 converts the corrected current command value to current command values of the U-phase coil, V-phase coil, and W-phase coil of the motor 9. Next, the PWM drive unit 23 outputs PWM signals of the U-phase coil, V-phase coil, and W-phase coil of the motor 9 on the basis of the converted current command values. The FET driver 24 drives the motor drive FET 25 according to the output PWM signals, and the motor drive FET 25 supplies drive current to the motor 9. Then, returning to step S102, changes of steps S102→S103→S104→S110→S111→S113 are repeated to repeat the setting of the gain G and the supply of the drive current to the motor 9, whereby the gain G is immediately or gradually increased up to the gain target value G*, as a result of which the assist force output by the motor 9 is immediately or gradually increased.

On the other hand, at step S114, the target value setting unit 32 sets the gain target value G* to a set value (for example, "0.5"). The set value can be any numerical value between the usual value of "1.0" and "0", and a numerical value other than "0.5" may be used.

Then, proceeding to step S115, the gain setting unit 33 sets the gain G on the basis of the gain target value G* set at step S114. Specifically, a multiplication result obtained by multiplying a prescribed rate $dG_{o1}/dt$ by the update time $t_o$ is added to or subtracted from the gain G stored in the memory 26 so that the gain G approaches the gain target value G*, and the gain G stored in the memory 26 is overwritten with a result of the calculation. The update time $t_o$ used is an elapsed time between a previous overwrite of the gain G stored in the memory 26 and the present time.

As a result, the control unit 29 controls the assist force output by the motor 9 on the basis of the gain G stored in the memory 26 and the steering torque T output from the torque sensor 5. Specifically, the current command value correction unit 28 multiplies the gain G stored in the memory 26 by a current command value calculated by the current command value calculation unit 27 to obtain a corrected current command value.

Next, the three-phase conversion unit 37 converts the corrected current command value to current command values of the U-phase coil, V-phase coil, and W-phase coil of the motor 9. Then, the PWM drive unit 23 outputs PWM signals of the U-phase coil, V-phase coil, and W-phase coil of the motor 9 on the basis of the converted current command values, the FET driver 24 drives the motor drive FET 25 according to the output PWM signals, and the motor drive FET 25 supplies drive current to the motor 9. The setting of the gain target value G* at step S114 and the setting of the gain G and the supply of the drive current to the motor 9 at step S115 as described above are repeated many times to gradually reduce or increase the gain G down or up to the gain target value G*, thereby gradually reducing or increasing the assist force output by the motor 9.

Next, proceeding to step S116, the gain setting unit 33 adds a multiplication result obtained by multiplying the gain G set at step S115 by the update time $t_o$ to the time-integrated value B of the gain G stored in the memory 26. This calculates the time-integrated value B of the gain G in a period (hereinafter referred to also as "abnormal period") from when the voltage of the battery 12 goes outside the range of the usual voltage to when the voltage is recovered to within the range of the usual voltage.

Then, proceeding to step S117, the gain setting unit 33 adds a multiplication result obtained by multiplying the usual value of "1.0" by the update time $t_o$ to the time-integrated value A of the gain stored in the memory 26, and then, processing returns to step S102. This calculates the time-integrated value A of the gain G when the gain G in the abnormal period is the usual value of "1.0".

On the other hand, at step S118, the target value setting unit 32 sets the gain target value G* to "0".

Next, proceeding to step S119, the gain setting unit 33 sets the gain G on the basis of the gain target value G* set at step S118. Specifically, as in step S115, a multiplication result obtained by multiplying a prescribed rate $dG_{o2}/dt$ by the update time $t_o$ is added to or subtracted from the gain G stored in the memory 26 so that the gain G approaches the gain target value G*, and the gain G stored in the memory 26 is overwritten with a result of the calculation. The update time $t_o$ used is an elapsed time between a previous overwrite of the gain G stored in the memory 26 and the present time.

As a result, the control unit 29 controls the assist force output by the motor 9 on the basis of the gain G stored in the memory 26 and the steering torque T output from the torque sensor 5. Specifically, the current command value correction unit 28 multiplies a current command value calculated by the current command value calculation unit 27 by the gain G stored in the memory 26 to obtain a corrected current command value.

Next, the three-phase conversion unit 37 converts the corrected current command value to current command values of the U-phase coil, V-phase coil, and W-phase coil of the motor 9. Then, the PWM drive unit 23 outputs PWM signals of the U-phase coil, V-phase coil, and W-phase coil of the motor 9 on the basis of the converted current command values, the FET driver 24 drives the motor drive FET 25 according to the output PWM signals, and the motor drive FET 25 supplies drive current to the motor 9. The setting of the gain target value G* at step S118 and the setting of the gain G and the supply of the drive current to the motor 9 at step S119 as described above are repeated many times to gradually reduce or increase the gain G down or up to the gain target value G*, thereby gradually reducing or increasing the assist force output by the motor 9.

Next, proceeding to step S120, the gain setting unit 33 adds a multiplication result obtained by multiplying the gain G set at step S119 by the update time $t_o$ to the time-integrated value B of the gain G stored in the memory 26. This calculates the time-integrated value B of the gain in the period (abnormal period) from when the voltage of the battery 12 goes outside the range of the usual voltage to when the voltage thereof is recovered to within the range of the usual voltage.

Then, proceeding to step S121, the gain setting unit 33 adds a multiplication result obtained by multiplying the usual value of "1.0" by the update time $t_o$ to the time-integrated value A of the gain stored in the memory 26, and then, processing returns to step S102. This calculates the time-integrated value A of the gain G when the gain G in the abnormal period is the usual value of "1.0".

Note that while the gain setting processing of the present embodiment has been described by the example where the gain target value G* is set to "0.5" when the voltage of the battery 12 is within the first low voltage region or the first high voltage region, and to "0" when the voltage thereof is within the second low voltage region or the second high voltage region, the numerical values "0.5" and "0" are merely examples and not intended to be limiting, and other numerical values may be used.

(Operation and Others)

Next, operation of the electric power steering control device 1 according to the embodiment of the present invention will be described with reference to the drawings.

Figure 8A:
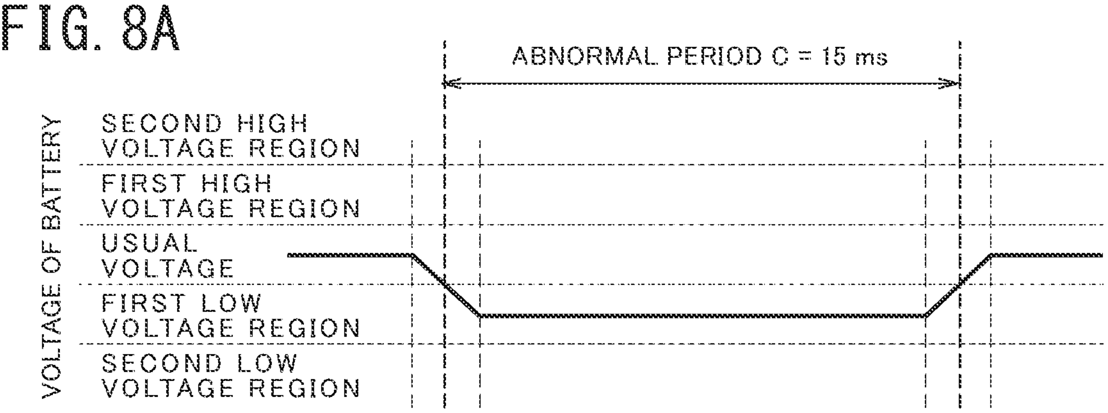
Figure 8B:
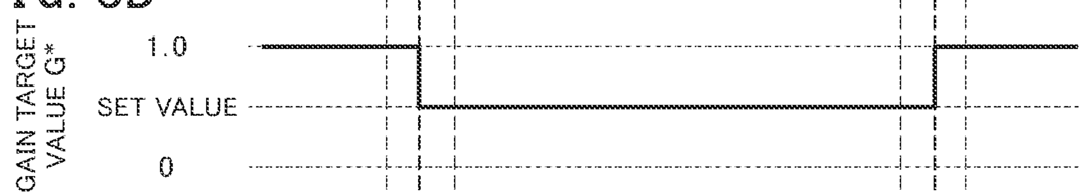

First, as illustrated in FIGS. 7A and 7B, assume that the starter motor connected to the engine has been started, and a large current has momentarily flowed through the starter motor, whereby the voltage of the battery 12 has started to drop, as illustrated at time to of FIG. 8A. Next, as illustrated at time $t_1$ of FIG. 8A, assume that the voltage of the battery 12 has changed from within the range of the usual voltage to the first low voltage region. Then, as illustrated at time $t_1$ of FIG. 8B, the ECU 13 maintains the gain target value G* at a set value (for example, "0.5") between a usual value (for example, "1.0") and "0", and reduces the gain G to approach the gain target value G* maintained at the set value of "0.5", as illustrated at time $t_1$ of FIG. 8C. This controls the motor 9 so that the assist force output by the motor 9 is slowly reduced down to 50% of an assist force output when the voltage of the battery 12 is within the range of the usual voltage (hereinafter referred to also as "usual assist force").

Next, assume that after the voltage of the battery 12 has stopped dropping and the voltage value of the battery 12 has become constant, as illustrated at time $t_2$ of FIG. 8A, recovery (increase) of the voltage of the battery 12 has started, as illustrated at time $t_3$ of FIG. 8A, and the voltage of the battery 12 has been recovered from the first low voltage region to within the range of the usual voltage, as illustrated at time $t_4$ of FIG. 8A. Then, the ECU 13 stops maintaining the gain target value G* at the set value of "0.5" and maintains the gain target value G* at the usual value of "1.0", as illustrated at time $t_4$ of FIG. 8B, and increases the gain G to approach the gain target value G* set at the usual value of "1.0", as illustrated at time $t_4$ of FIG. 8C.

In this case, assume that the ratio R obtained by dividing the time-integrated value B of the gain G in a period (hereinafter referred to also as "abnormal period C") from when the voltage of the battery 12 goes outside the range of the usual voltage to when the voltage thereof is recovered to within the range of the usual voltage by the time-integrated value A of the gain G when the gain G in the abnormal period C is the usual value of "1.0" is larger than the prescribed threshold Rth of "0.5" (for example, R=0.8). Then, the relatively fast first recovery rate $dG_1/dt$ is employed as the fluctuation rate dG/dt of the gain G. As a result, as illustrated from time $t_4$ to time $t_5$ of FIG. 8C, the gain G immediately increases up to the gain target value G* of "1.0", and the motor 9 is controlled so that the assist force output by the motor 9 immediately increases up to the usual assist force.

Figure 9A:
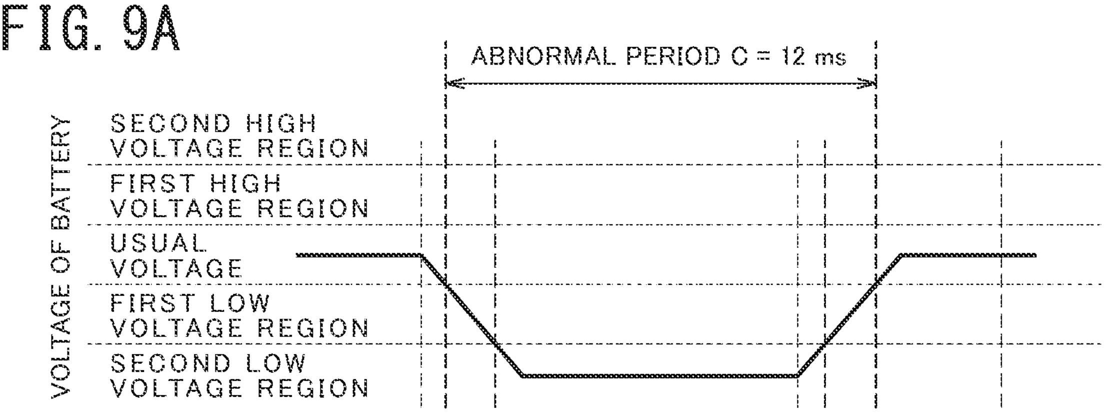

On the other hand, as in time to and time $t_1$ of FIG. 8A, assume that the voltage of the battery 12 has started to drop, as illustrated at time $t_6$ of FIG. 9A, and the voltage of the battery 12 has changed from within the range of the usual voltage to the first low voltage region, as illustrated at time $t_7$ of FIG. 9A. Then, the ECU 13 maintains the gain target value G* at the set value of "0.5", as illustrated at time $t_7$ of FIG. 9B, and reduces the gain G to approach the gain target value G* maintained at the set value of "0.5", as illustrated at time $t_7$ of FIG. 9C. Next, as illustrated at time $t_8$ of FIG. 9A, when the voltage of the battery 12 changes from the first low voltage region to the second low voltage region, the ECU 13 stops maintaining the gain target value G* at the set value of "0.5" and maintains the gain target value G* at "0", as illustrated at time $t_8$ of FIG. 9B, and reduces the gain G to approach the gain target value G* maintained at "0", as illustrated at time $t_8$ of FIG. 9C. This controls the motor 9 so that the assist force is reduced down to "0", as illustrated at time $t_8$ of FIG. 9C.

Figure 9B:
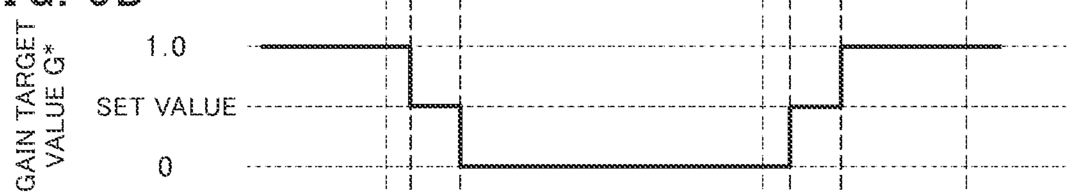
Figure 9C:
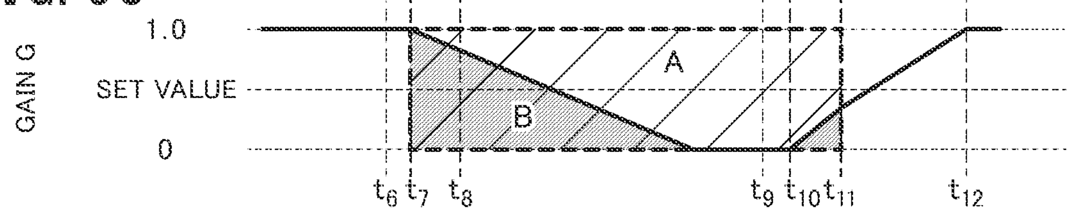

Then, when recovery of the voltage of the battery 12 starts, as illustrated at time $t_9$ of FIG. 9A, and the voltage of the battery 12 changes from the second low voltage region to the first low voltage region, as illustrated at time do of FIG. 9A, the ECU 13 stops maintaining the gain target value G* at "0" and maintains the gain target value G* at the set value of "0.5", as illustrated at time $t_{10}$ of FIG. 9B, and increases the gain G to approach the gain target value G* maintained at the set value of "0.5", as illustrated at time $t_{10}$ of FIG. 9C. Next, assume that the voltage of the battery 12 has been recovered from the first low voltage region to within the range of the usual voltage, as illustrated at time $t_{11}$ of FIG. 9A. Then, the ECU 13 stops maintaining the gain target value G* at the set value of "0.5" and maintains the gain target value G* at the usual value of "1.0", as illustrated at time $t_{11}$ of FIG. 9B, and increases the gain G to approach the gain target value G* maintained at the usual value of "1.0", as illustrated at time $t_{11}$ of FIG. 9C.

In this case, assume that the ratio R obtained by dividing the time-integrated value B of the gain G in the abnormal period C by the time-integrated value A of the gain G when the gain Gin the abnormal period C is the usual value of "1.0" is smaller than the prescribed threshold Rth of "0.5" (for example, R=0.4). Then, the relatively slow second recovery rate $dG_2/dt$ (<first recovery rate $dG_1/dt$) is employed as the fluctuation rate dG/dt of the gain G. As a result, as illustrated from time $t_{11}$ to time $t_{12}$ of FIG. 9C, the gain G gradually increases up to the gain target value G* of "1.0", and the motor 9 is controlled so that the assist force output by the motor 9 gradually increases up to the usual assist force.

Figure 10A:
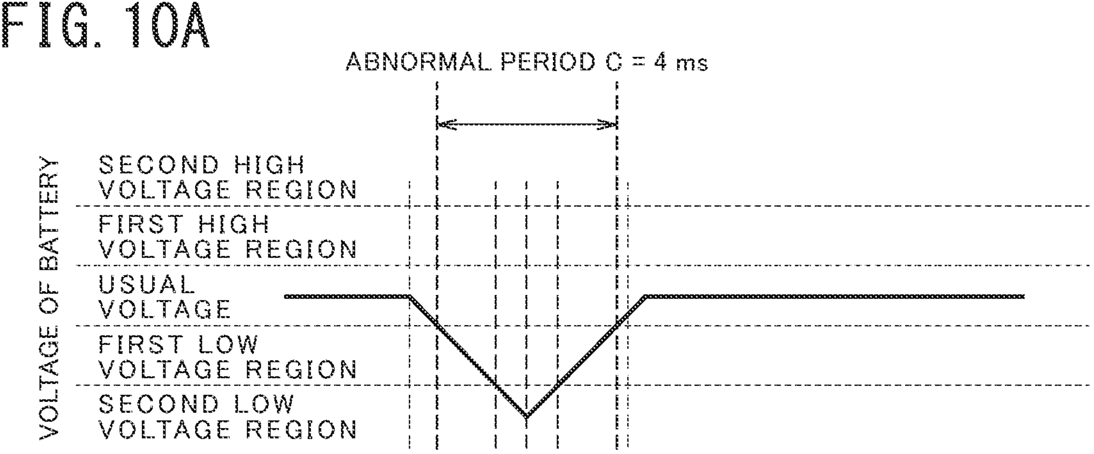
Figure 10B:
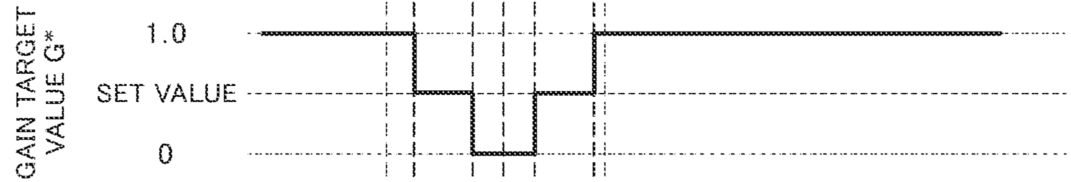
Figure 10C:
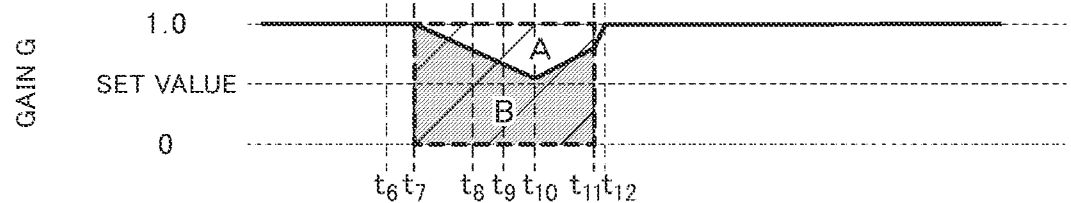

Here, for example, as illustrated in FIGS. 10A, 10B, and 10C, assume that the period (abnormal period C) from when the voltage of the battery 12 goes outside the range of the usual voltage to when the voltage thereof is recovered to within the range of the usual voltage is short, and the ratio R is larger than the prescribed threshold Rth of "0.5" (for example, R=0.8). Then, the relatively fast first recovery rate $dG_1/dt$ is employed as the fluctuation rate dG/dt of the gain G. As a result, as illustrated from time $t_{11}$ to time $t_{12}$ of FIG. 10C, the gain G immediately increases up to the gain target value G* of "1.0", and the motor 9 is controlled so that the assist force output by the motor 9 immediately increases up to the usual assist force.

Thus, according to FIGS. 8A to 8C and 9A to 9C, the ratio R is larger than the prescribed threshold Rth when the abnormal period C is long, whereas the ratio R is smaller than the prescribed threshold Rth when the abnormal period C is short, so that at first glance, it seems that a magnitude relationship between the ratio R and the prescribed threshold Rth is determined solely by the length of the abnormal period C. However, in the electric power steering control device 1 according to the embodiment of the present invention, even when the abnormal period C is short (4 ms), the ratio R is larger than the prescribed threshold Rth, as illustrated in FIGS. 10A to 10C. Accordingly, the structure is clearly different from one in which the magnitude relationship between the ratio R and the prescribed threshold Rth is determined solely by the length of the abnormal period C.

Additionally, on the other hand, assume that the tire of the steered wheel 14L or 14R has ridden up on a curb and has received a steering reaction force, thereby generating a regenerative current in the motor 9, which has started to increase the voltage of the battery 12, as illustrated at time $t_{13}$ of FIG. 11A. Then, when the voltage of the battery 12 changes from within the range of the usual voltage to the first high voltage region, as illustrated at time $t_{14}$ of FIG. 11A, the ECU 13 maintains the gain target value G* at the set value of "0.5", as illustrated at time $t_{14}$ of FIG. 11B, and reduces the gain G to approach the gain target value G* maintained at the set value of "0.5", as illustrated at time $t_{14}$ of FIG. 11C. This controls the motor 9 so that the assist force output by the motor 9 is slowly reduced down to 50% of the usual assist force.

Next, assume that after the voltage of the battery 12 has stopped increasing and the voltage value of the battery 12 has become constant, as illustrated at time $t_{15}$ of FIG. 11A, recovery (drop) of the voltage of the battery 12 has started, as illustrated at time $t_{16}$ of FIG. 11A, and the voltage of the battery 12 has been recovered from the first high voltage region to within the range of the usual voltage, as illustrated at time $t_{17}$ of FIG. 11A. Then, the ECU 13 stops maintaining the gain target value G* at the set value of "0.5" and maintains the gain target value G* at the usual value of "1.0", as illustrated at time $t_{17}$ of FIG. 11B, and increases the gain G to approach the gain target value G* maintained at the usual value of "1.0", as illustrated at time $t_{17}$ of FIG. 11C. In this case, assume that the ratio R obtained by dividing the time-integrated value B of the gain G in the abnormal period C by the time-integrated value A of the gain G when the gain G in the abnormal period C is the usual value of "1.0" is larger than the prescribed threshold Rth of "0.5" (for example, R=0.8). Then, the relatively fast first recovery rate $dG_1/dt$ is employed as the fluctuation rate dG/dt of the gain G. As a result, as illustrated from time $t_{17}$ to time $t_{18}$ of FIG. 11C, the gain G immediately increases up to the gain target value G* of "1.0", and the motor 9 is controlled so that the assist force output by the motor 9 immediately increases up to the usual assist force.

Additionally, on the other hand, as in time $t_{13}$ and time $t_{14}$ of FIG. 11A, assume that the voltage of the battery 12 has started to increase, as illustrated at time $t_{19}$ of FIG. 12A, and the voltage of the battery 12 has changed from within the range of the usual voltage to the first high voltage region, as illustrated at time $t_{20}$ of FIG. 12A. Then, the ECU 13 maintains the gain target value G* at the set value of "0.5", as illustrated at time $t_{20}$ of FIG. 12B, and reduces the gain G to approach the gain target value G* maintained at the set value of "0.5", as illustrated at time $t_{20}$ of FIG. 12C.

Next, when the voltage of the battery 12 changes from the first high voltage region to the second high voltage region, as illustrated at time $t_{21}$ of FIG. 12A, the ECU 13 stops maintaining the gain target value G* at the set value of "0.5" and maintains the gain target value G* at "0", as illustrated at time $t_{21}$ of FIG. 12B, and reduces the gain G to approach the gain target value maintained at "0", as illustrated at time $t_{21}$ of FIG. 12C. This controls the motor 9 so that the assist force output by the motor 9 is reduced down to "0", as illustrated at time $t_{21}$ of FIG. 12C.

Next, when recovery of the voltage of the battery 12 starts, as illustrated at time $t_{22}$ of FIG. 12A, and the voltage of the battery 12 changes from the second high voltage region to the first high voltage region, as illustrated at time $t_{23}$ of FIG. 12A, the ECU 13 stops maintaining the gain target value G* at "0" and maintains the gain target value G* at the set value of "0.5", as illustrated at time $t_{23}$ of FIG. 12B, and increases the gain G to approach the gain target value G* maintained at the set value of "0.5", as illustrated at time $t_{23}$ of FIG. 12C. Next, assume that the voltage of the battery 12 has been recovered from the first high voltage region to within the range of the usual voltage, as illustrated at time $t_{24}$ of FIG. 12A. Then, the ECU 13 stops maintaining the gain target value G* at the set value of "0.5" and maintains the gain target value G* at the usual value of "1.0", as illustrated at time $t_{24}$ of FIG. 12B, and increases the gain G to approach the gain target value G* maintained at the usual value of "1.0", as illustrated at time $t_{24}$ of FIG. 12C. In this case, assume that the ratio R obtained by dividing the time-integrated value B of the gain G in the abnormal period C by the time-integrated value A of the gain G when the gain G in the abnormal period C is the usual value of "1.0" is smaller than the prescribed threshold Rth of "0.5" (for example, R=0.4). Then, the relatively slow second recovery rate $dG_2/dt$ (<first recovery rate $dG_1/dt$) is employed as the fluctuation rate dG/dt of the gain G. As a result, as illustrated from time $t_{24}$ to time $t_{25}$ of FIG. 12C, the gain G gradually increases up to the gain target value G* of "1.0", and the motor 9 is controlled so that the assist force output by the motor 9 gradually increases up to the usual assist force.

As described above, the electric power steering control device 1 according to the embodiment of the present invention is configured to include the motor 9 configured to receive electrical power from the battery 12 and output an assist force for assisting steering with the steering wheel 2, the battery voltage sensor 19 configured to detect the voltage of the battery 12, the target value setting unit 32 configured to set the gain target value G*, which is the target value of the gain G used to control the assist force output by the motor 9, on the basis of the voltage detected by the battery voltage sensor 19, the gain setting unit 33 configured to set the gain G on the basis of the gain target value G* set by the target value setting unit 32, the torque sensor 5 configured to detect the steering torque T applied by the steering wheel 2, and the control unit 29 configured to control the assist force output by the motor 9 on the basis of the gain G set by the gain setting unit 33 and the steering torque T detected by the torque sensor 5.

Then, the target value setting unit 32 is configured to set the gain target value G* to the predetermined usual value of "1.0" when the voltage detected by the battery voltage sensor 19 is within the predetermined range of usual voltage, and set the gain target value G* to a value below the usual value of "1.0" when the voltage detected by the battery voltage sensor 19 is outside the range of the usual voltage. Additionally, when the voltage detected by the battery voltage sensor 19 is recovered from outside the range of the usual voltage to within the range thereof, the gain setting unit 33 determines whether or not the ratio R obtained by dividing the time-integrated value B of the gain G in the period (abnormal period C) from when the voltage of the battery 12 goes outside the range of the usual voltage to when the voltage thereof is recovered to within the range of the usual voltage by the time-integrated value A of the gain G when the gain G in the abnormal period C is the usual value of "1.0" is larger than the predetermined prescribed threshold Rth of "0.5". When the ratio R is determined to be larger than the prescribed threshold Rth of "0.5", the gain setting unit 33 sets the gain G to immediately increase up to the gain target value G*. On the other hand, when the ratio R is determined to be equal to or less than the prescribed threshold Rth of "0.5", the gain setting unit 33 sets the gain G to gradually increase up to the gain target value G*.

Figure 8C:
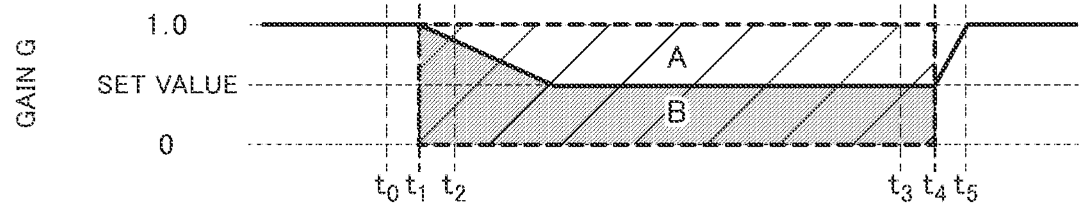

Therefore, for example, as illustrated in FIGS. 8C, 10C, and 11C, when the time-integrated value B of the gain G from when the voltage of the battery 12 goes outside the range of the usual voltage to when the voltage thereof is recovered to within the range of the usual voltage is large as compared to the time-integrated value A of the gain G when the gain G is the usual value of "1.0", the gain G is immediately increased up to the gain target value G*, which can thus reduce the time during which the steering wheel 2 feels heavy. Additionally, as illustrated in FIGS. 9C and 12C, when the time-integrated value B of the gain G when the voltage of the battery 12 has been recovered to within the range of the usual voltage is small as compared to the time-integrated value A of the gain G when the gain G is the usual value of "1.0", the gain G is gradually increased up to the gain target value G*, which can thus prevent the steering wheel 2 from becoming light suddenly. Accordingly, the electric power steering control device 1 capable of improving steering feeling can be provided.

Additionally, the electric power steering control device 1 according to the embodiment of the present invention is configured to set the gain target value G* on the basis of the voltage of the battery 12, set the gain G on the basis of the gain target value G*, and control the assist force on the basis of the gain G, so that deterioration of steering feeling of the driver can be suppressed. This is particularly effective in case of battery voltage fluctuations during steering, and the like.

Incidentally, if the gain target value G* is not set to a value below "1.0" when the voltage of the battery 12 is outside the range of the usual voltage, the battery 12 may be deteriorated, failure of other equipment may be induced, or the motor drive FET 25 may be thermally damaged. Additionally, if the gain G is set to immediately increase up to the gain target value G* even when the ratio R is equal to or less than the prescribed threshold Rth, there may be felt a steering discomfort as if the torque has been lost.

In contrast, in the electric power steering control device 1 according to the embodiment of the present invention, the gain target value G* is set to a value below "1.0" when the voltage of the battery 12 is outside the range of the usual voltage, which can thus prevent deterioration of the battery 12, induced failure of other equipment, and thermal damage to the motor drive FET 25. In addition, when the ratio R is equal to or less than the prescribed threshold Rth of "0.5", the gain G is set to gradually increase up to the gain target value G*, which can thus prevent the driver from feeling the steering discomfort as if the torque has been lost.

(Modifications)

(1) The electric power steering control device 1 according to the embodiment of the present invention has been described by exemplifying the case where the increase rate (at least one of the first recovery rate $dG_1/dt$ and the second recovery rate $dG_2/dt$, which is hereinafter referred to as "recovery rate") of the gain G when the gain setting unit 33 increases the gain G up to the gain target value G* is set to a constant value. However, other structures may be employed. For example, the recovery rate may be set according to the value of the ratio R. Specifically, the larger the ratio R, the larger the recovery rate may be set, whereas the smaller the ratio R, the smaller the recovery rate may be set.

Figure 13:
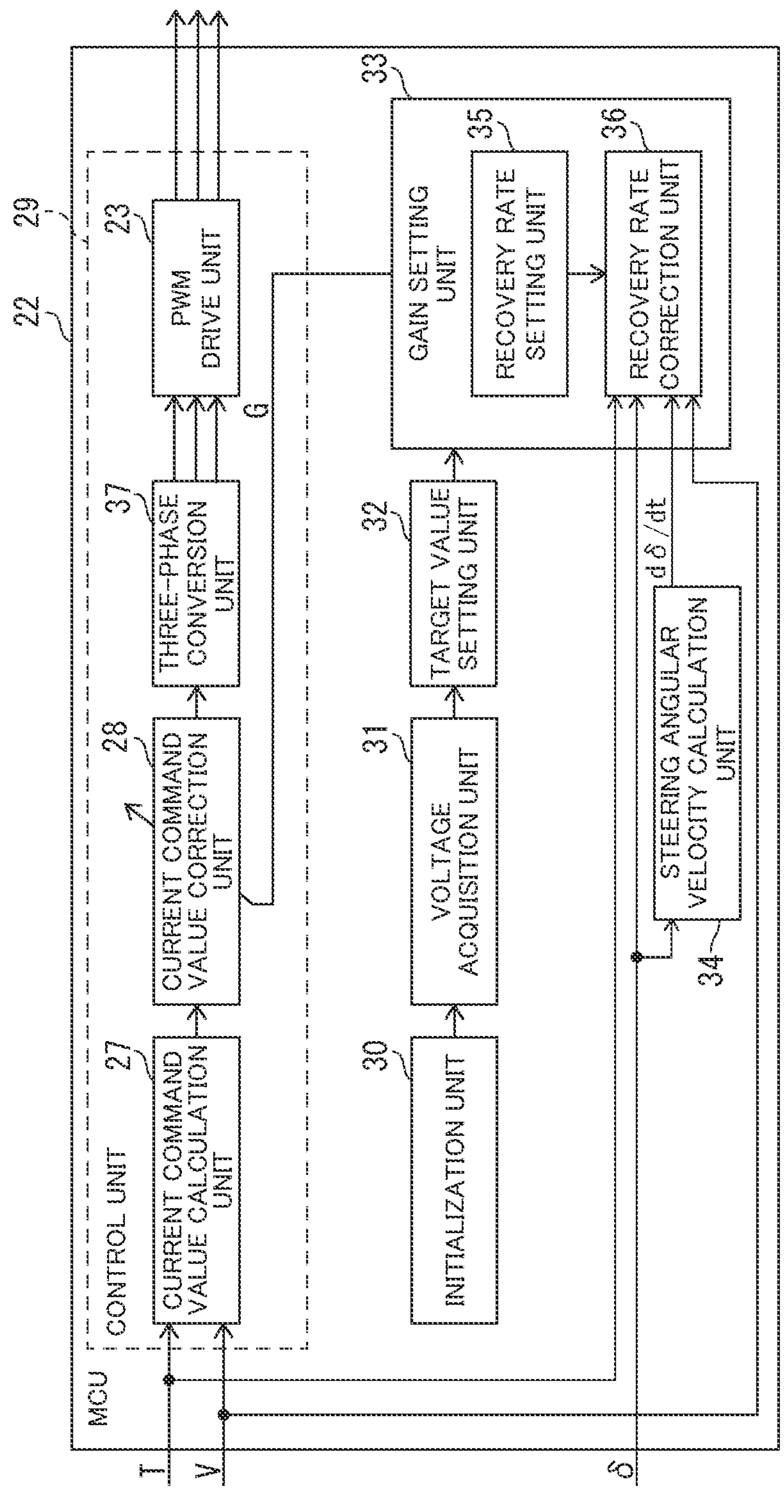
FIG. 13 is a diagram illustrating the inner structure of an MCU according to a modification.

(2) Additionally, for example, the gain setting unit 33 may be configured to set the recovery rate on the basis of at least one or a combination of two or more of the ratio R, the steering torque T, the steering angle δ, the steering angular velocity dδ/dt, and the vehicle speed V. Specifically, for example, as illustrated in FIG. 13, the MCU 22 may realize a steering angular velocity calculation unit 34 by software, and the gain setting unit 33 may include a recovery rate setting unit 35 and a recovery rate correction unit 36.

The steering angular velocity calculation unit 34 calculates the steering angular velocity dδ/dt on the basis of the steering angle δ output from the steering angle detection circuit 16. The calculated steering angular velocity dδ/dt is output to the gain setting unit 33.

The recovery rate setting unit 35 sets the recovery rate to a larger value as the ratio R is larger, and to a smaller value as the ratio R is smaller. Additionally, the recovery rate correction unit 36 corrects the recovery rate set by the recovery rate setting unit 35 on the basis of at least one or a combination of two or more of the steering torque T, the steering angle δ, the steering angular velocity dδ/dt, and the vehicle speed V. For example, when at least any of the steering torque T, the steering angle δ, the steering angular velocity dδ/dt, and the vehicle speed V is smaller than a prescribed threshold and it is difficult to feel a discomfort in steering feeling, the recovery rate set by the recovery rate setting unit 35 is increased. On the other hand, when at least any of the steering torque T, the steering angle δ, the steering angular velocity dδ/dt, and the vehicle speed V is equal to or more than the prescribed threshold and it is easy for the driver to feel a discomfort in steering feeling, the recovery rate set by the recovery rate setting unit 35 is reduced. This allows the recovery rate correction unit 36 to appropriately operate as a rate limiter, and enables the gain G to be quickly recovered to a usual state while minimizing deterioration of steering feeling.

Figure 14:
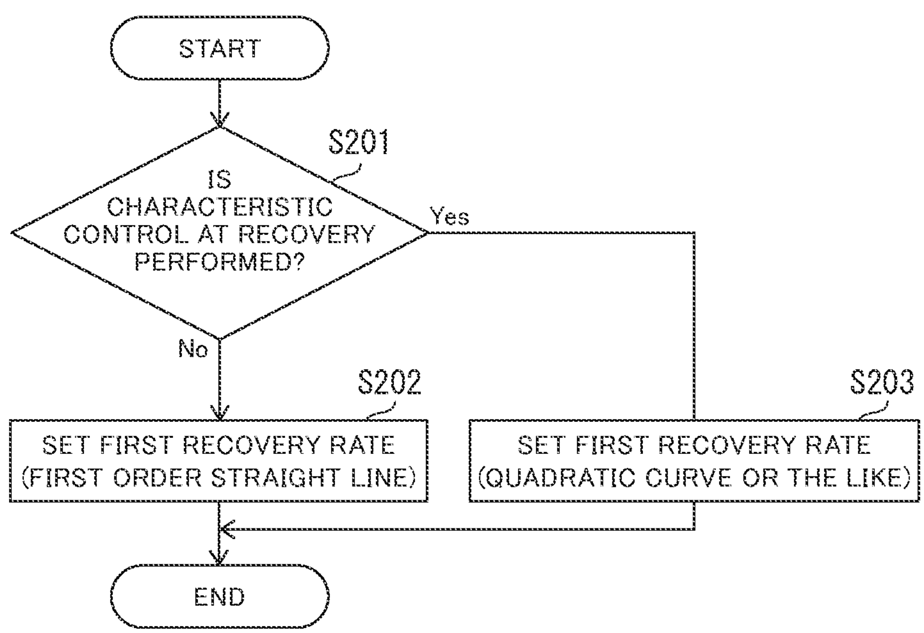
FIG. 14 is a flowchart illustrating processing for setting a first recovery rate.

(3) In addition, another method for setting the recovery rate on the basis of the steering torque T, the steering angle δ, the steering angular velocity dδ/dt, the vehicle speed V, and the like may be a method not using correction. Specifically, when setting the fluctuation rate dG/dt at step S107, the gain setting unit 33 executes processing for setting the first recovery rate $dG_1/dt$. When the processing for setting the first recovery rate $dG_1/dt$ is executed, the gain setting unit 33 first determines, at step S201, as illustrated in FIG. 14, whether or not to perform characteristic control at recovery to set the first recovery rate $dG_1/dt$ in consideration of the steering torque T and the like. Then, when the characteristic control at recovery is determined not to be performed (No), processing proceeds to step S202. On the other hand, when the characteristic control at recovery is determined to be performed (Yes), processing proceeds to step S203.

At step S202, the gain setting unit 33 sets the first recovery rate $dG_1/dt$ so that the gain G increases in a first order straight line $G=a\cdot t+b$, as illustrated in FIGS. 5 and 6. Here, a and b represent fixed values. In FIG. 6, $T_1$ represents a time when recovery of the gain G has started (when the voltage has returned to within the range of the usual voltage), $T_2$ represents a time when the recovery thereof is complete, $a_1$ represents the gain G at the time when the recovery thereof has started, and $a_2$ represents the gain G (=1.0) at the time when the recovery thereof is complete. When these are applied to the above equation: $G=a\cdot t+b$, the results are as follows: $a=(a_2-a_1)/(T_2-T_1)$ and $b=a_1$.

On the other hand, at step S203, the gain setting unit 33 determines whether at least any of the steering torque T, the steering angle δ, the steering angular velocity dδ/dt, and the vehicle speed V is larger than a prescribed threshold. For example, it is determined whether any one or more of four conditions: (1) an absolute value of the steering torque T is larger than a first threshold; (2) an absolute value of the steering angle δ is larger than a second threshold; (3) an absolute value of the steering angular velocity dδ/dt is larger than a third threshold; and (4) the vehicle speed V is larger than a fourth threshold are satisfied. When determined to be satisfied, at least any of the steering torque T, the steering angle δ, the steering angular velocity dδ/dt, and the vehicle speed V is determined to be larger than the prescribed threshold. Then, when determined to be larger than the prescribed threshold, the first recovery rate $dG_1/dt$ is set so that the gain G increases in a slow curve that is a downwardly convex quadratic curve $G=a\cdot t^2+b$, and then the setting processing is ended.

On the other hand, when determined to be smaller than the prescribed threshold, the first recovery rate $dG_1/dt$ is set so that the gain G increases in an early rising curve that is an upwardly convex curve $G=a\cdot t^{1/2}+b$, and then the setting processing is ended. Note that "2" included in the functions of "$t^2$" and "$t^{1/2}$" in the above quadratic curves may be regarded as a variable, and higher order functions, such as "$t^3$" and "$t^{1/3}$", may be used.

Furthermore, when setting the fluctuation rate dG/dt at step S108, the gain setting unit 33 executes processing for setting the second recovery rate $dG_2/dt$, and sets the second recovery rate $dG_2/dt$ in the same method as the above-described method for setting the first recovery rate $dG_1/dt$. The second recovery rate $dG_2/dt$ to be set is a rate slower than the first recovery rate $dG_1/dt$ set at steps S202 and S203.

Figure 15:
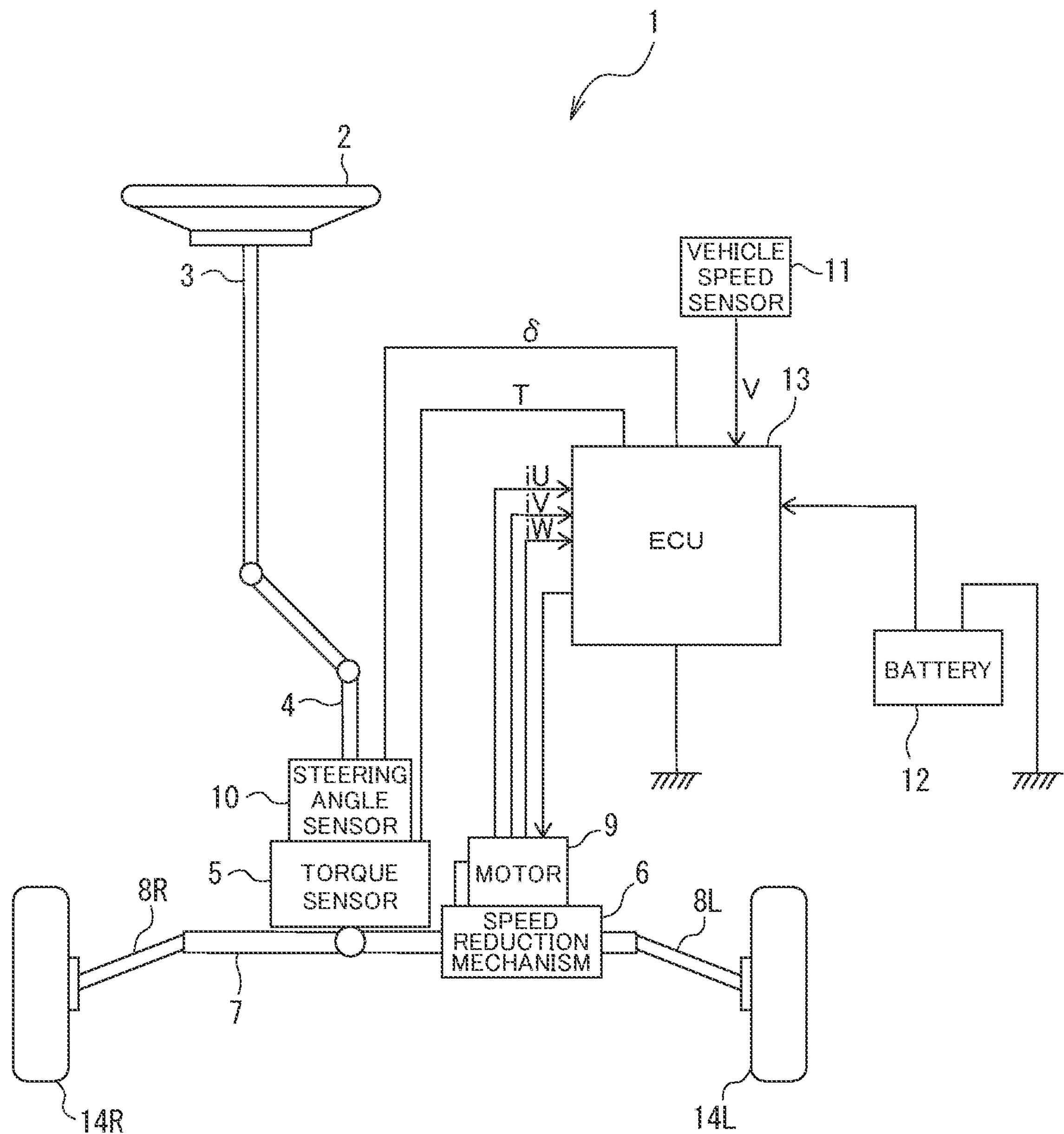
FIG. 15 is a diagram illustrating the structure of an electric power steering control device according to a modification.

(4) Furthermore, while the present embodiment has described the example where the electric power steering control device 1 according to the present invention is applied to the column type EPS in which a steering assist force output by the motor 9 is applied to the steering shaft 3, other structures may be employed. For example, as illustrated in FIG. 15, the electric power steering control device 1 may be applied to a downstream type EPS in which a steering assist force output by the motor 9 is directly applied to a rack shaft.

REFERENCE SIGNS LIST

1: Electric power steering control device
2: Steering wheel
3: Steering shaft
4: Pinion input shaft
5: Torque sensor
6: Speed reduction mechanism
7: Rack and pinion
8L: Rod
8R: Rod
9: Motor
10: Steering angle sensor
11: Vehicle speed sensor
12: Battery
13: ECU
14L, 14R: Steered wheel
15: Torque detection circuit
16: Steering angle detection circuit
17: Vehicle speed detection circuit
18: Motor current sensor
19: Battery voltage sensor
20: Charge pump circuit
21: Charge pump voltage sensor
22: MCU
23: PWM drive unit
24: FET driver
25: Motor drive FET
26: Memory
27: Current command value calculation unit
28: Current command value correction unit
29: Control unit
30: Initialization unit
31: Voltage acquisition unit
32: Target value setting unit
33: Gain setting unit
34: Steering angular velocity calculation unit
35: Recovery rate setting unit
36: Recovery rate correction unit
37: Three-phase conversion unit

The invention claimed is:

1. An electric power steering control device comprising:

a motor configured to receive electrical power from a battery and output an assist force for assisting steering with a steering wheel;

a battery voltage sensor configured to detect a voltage of the battery;

a target value setting unit configured to set a gain target value, which is a target value of a gain used to control the assist force output by the motor, on a basis of the voltage detected by the battery voltage sensor;

a gain setting unit configured to set the gain on a basis of the gain target value set by the target value setting unit;

a torque sensor configured to detect a steering torque applied by the steering wheel; and a control unit configured to control the assist force output by the motor on a basis of the gain set by the gain setting unit and the steering torque detected by the torque sensor, wherein the target value setting unit sets the gain target value to a predetermined usual value when the voltage detected by the battery voltage sensor is within a predetermined range of usual voltage, and sets the gain target value to a value below the usual value when the voltage is outside the range of the usual voltage; and wherein when the voltage detected by the battery voltage sensor is recovered from outside the range of the usual voltage to within the range of the usual voltage, the gain setting unit determines whether or not a ratio obtained by dividing a time-integrated value of the gain in a period from when the voltage goes outside the range of the usual voltage to when the voltage is recovered to within the range of the usual voltage by a time-integrated value of the gain when the gain in the period is the usual value is larger than a predetermined prescribed threshold, the gain setting unit setting the gain to immediately increase up to the gain target value when the ratio is determined to be larger than the prescribed threshold, and setting the gain to gradually increase up to the gain target value when the ratio is determined to be equal to or less than the prescribed threshold.

2. The electric power steering control device according to claim 1, wherein the gain setting unit sets a recovery rate, which is an increase rate of the gain when increasing the gain up to the gain target value, on a basis of at least one or a combination of two or more of the ratio, the steering torque, a steering angle, a steering angular velocity, and a vehicle speed.

3. The electric power steering control device according to claim 2, wherein the gain setting unit includes a recovery rate setting unit configured to set the recovery rate to a larger value as the ratio is larger, and to a smaller value as the ratio is smaller.

4. The electric power steering control device according to claim 3, wherein the gain setting unit includes a recovery rate correction unit configured to correct the recovery rate set by the recovery rate setting unit on a basis of at least one or a combination of two or more of the steering torque, the steering angle, the steering angular velocity, and the vehicle speed.

5. The electric power steering control device according to claim 1, wherein the control unit includes a current command value calculation unit configured to calculate a current command value for controlling the assist force output by the motor on a basis of the steering torque detected by the torque sensor, a current command value correction unit configured to multiply the current command value calculated by the current command value calculation unit by the gain set by the gain setting unit to obtain a corrected current command value, a three-phase conversion unit configured to convert the corrected current command value obtained by the current command value correction unit to current command values of a U-phase coil, a V-phase coil, and a W-phase coil of the motor, a PWM drive unit configured to generate pulse width modulation (PWM) signals on a basis of the converted current command values converted by the three-phase conversion unit, and a FET driver configured to, according to the PWM signals generated by the PWM drive unit, drive a motor drive FET configured to supply drive current to the motor.

* * * * *